United States Patent
Senzaki

(10) Patent No.: US 12,180,317 B2
(45) Date of Patent: Dec. 31, 2024

(54) POLYMERIZABLE COMPOSITION AND HYDROPHILIZING TREATMENT METHOD

(71) Applicant: TOKYO OHKA KOGYO CO., LTD., Kanagawa (JP)

(72) Inventor: Takahiro Senzaki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 17/678,350

(22) Filed: Feb. 23, 2022

(65) Prior Publication Data

US 2022/0267495 A1 Aug. 25, 2022

(30) Foreign Application Priority Data

Feb. 24, 2021 (JP) ................................. 2021-027663

(51) Int. Cl.
*C09D 147/00* (2006.01)
*C08F 236/20* (2006.01)

(52) U.S. Cl.
CPC .......... *C08F 236/20* (2013.01); *C09D 147/00* (2013.01)

(58) Field of Classification Search
CPC ............................ C09D 147/00; C08F 236/20
See application file for complete search history.

(56) References Cited

FOREIGN PATENT DOCUMENTS

| CN | 108727937 | * | 11/2018 | ............ C08F 220/06 |
| CN | 110437370 | * | 8/2019 | .............. B25J 15/12 |
| JP | 2009-126948 | | 6/2009 | |
| JP | 5437523 | | 3/2014 | |
| JP | 2016003319 A | * | 1/2016 | ............ C08F 290/06 |
| JP | 2019006943 | * | 1/2019 | ............ C08F 220/34 |

OTHER PUBLICATIONS

CN110437370 English translation (Year: 2019).*
CN108727937 English translation (Year: 2018).*
JP2016003319A English translation (Year: 2016).*
Jp2019006943 English Translation (Year: 2019).*

* cited by examiner

*Primary Examiner* — Catherine S Branch
*Assistant Examiner* — Huihong Qiao
(74) *Attorney, Agent, or Firm* — Wenderoth, Lind & Ponack, L.L.P.

(57) ABSTRACT

To provide a polymerizable composition capable of forming a thick hydrophilic resin coating having high hardness and excellent durability on the surface of an object to be treated, which is a surface treatment object, and a hydrophilizing treatment method in which the polymerizable composition is used. In a polymerizable composition including a polymerizable compound (A), a polymerization initiator (B), inorganic fine particles (C) and a solvent (S), a polymerizable betaine compound (A1) having an ethylenic unsaturated double bond and a betaine structure and an adhesive polymerizable compound (A2) having an ethylenic unsaturated double bond and a specific type of adhesive group are used as the polymerizable compound (A); a water-soluble radical polymerization initiator (B1) is used as the polymerization initiator (B); and inorganic fine particles (C) having a functional group capable of forming a covalent bond with a polymer of the polymerizable compound (A) are used.

14 Claims, No Drawings

POLYMERIZABLE COMPOSITION AND HYDROPHILIZING TREATMENT METHOD

BACKGROUND OF THE INVENTION

Field of the Invention

The present invention relates to a polymerizable composition and a hydrophilizing treatment method in which the polymerizable composition is used.

Related Art

In order to modify the properties of surfaces of a variety of articles, surface treatments have been thus far carried out using a variety of surface treatment liquids. As surface modification, particularly, hydrophilization of the surfaces of articles has been significantly demanded, and a number of chemicals and surface treatment liquids for hydrophilization have been proposed. A surface treatment of an object using a chemical or surface treatment liquid for hydrophilization forms a coating on the surface of the object and hydrophilizes the surface of the object.

As such chemical agents for hydrophilization or surface treatment liquids, for example, a hydrophilizing treatment agent including a copolymer in which at least an acrylamide monomer and a mono(meth)acrylate monomer are used as components for developing hydrophilicity (Patent Document 1) or a hydrophilizing treatment agent including a block copolymer of a polyvinyl alcohol resin block having a mercapto group and a polyanionic resin block obtained by polymerizing a polymerizable monomer having at least one of a carboxy group and/or a sulfonate group in one molecule and a polyacrylic acid (Patent Document 2) have been proposed.

Patent Document 1: Japanese Patent No. 5437523
Patent Document 2: Japanese Unexamined Patent Application, Publication No. 2009-126948

SUMMARY OF THE INVENTION

However, the resin, which is a hydrophilization component included in the hydrophilizing treatment agent of the related art described in Patent Document 1, Patent Document 2 or the like, does not always have sufficient adhesion to the surface of an object to be treated. As a result, the hydrophilizing treatment agent of the related art described in Patent Document 1, Patent Document 2 or the like has a problem in that there is a case where it is difficult to obtain a sufficient hydrophilization effect or the hydrophilizing treatment agent is likely to peel off from the surface of the object to be treated and only a poorly durable resin coating can be formed, which is likely to impair the hydrophilization effect.

The present invention has been made in consideration of the above-described problem, and an objective of the present invention is to provide a polymerizable composition capable of forming a thick hydrophilic resin coating having high hardness and excellent durability on the surface of an object to be treated, which is a surface treatment object, and a hydrophilizing treatment method in which the polymerizable composition is used.

The present inventors found that, in a polymerizable composition including a polymerizable compound (A), a polymerization initiator (B), inorganic fine particles (C) and a solvent (S), when a polymerizable betaine compound (A1) having an ethylenic unsaturated double bond and a betaine structure and an adhesive polymerizable compound (A2) having an ethylenic unsaturated double bond and a specific type of adhesive group are used as the polymerizable compound (A), a water-soluble radical polymerization initiator (B1) is used as the polymerization initiator (B), and inorganic fine particles (C) having a functional group capable of forming a covalent bond with a polymer of the polymerizable compound (A) are used, the above-described problem can be solved and completed the present invention. In more detail, the present invention provides the followings.

A first aspect of the present invention is a polymerizable composition including a polymerizable compound (A), a polymerization initiator (B), inorganic fine particles (C) and a solvent (S), in which the polymerizable compound (A) includes a polymerizable betaine compound (A1) and an adhesive polymerizable compound (A2), the polymerizable betaine compound (A1) has an ethylenic unsaturated double bond and a betaine structure, the adhesive polymerizable compound (A2) has an ethylenic unsaturated double bond and at least one adhesive group selected from the group consisting of a hydrolysable silyl group, an amino group, a carboxy group, a mercapto group, a cyano group and a hydroxyl group, the polymerization initiator (B) includes a water-soluble radical polymerization initiator (B1), and the inorganic particles (C) have a functional group capable of forming a covalent bond with a polymer of the polymerizable compound (A).

A second aspect of the present invention is a hydrophilizing treatment method for hydrophilizing a surface of an object to be treated, the method including applying the polymerizable composition according to the first aspect to form a coating film on the surface of the object to be treated and heating the coating film to form a coating on the surface of the object to be treated.

According to the present invention, it is possible to provide a polymerizable composition capable of forming a thick hydrophilic resin coating having high hardness and excellent durability on the surface of an object to be treated, which is a surface treatment object, and a hydrophilizing treatment method in which the polymerizable composition is used.

DETAILED DESCRIPTION OF THE INVENTION

<<Polymerizable Composition>>

The polymerizable composition includes a polymerizable compound (A), a polymerization initiator (B), inorganic fine particles (C) and a solvent (S). Such a polymerizable composition is capable of hydrophilizing the surface of an object to be treated, which is an object of a surface treatment. Hereinafter, regarding the polymerizable composition, arbitrary components, essential components and the like will be described.

<Polymerizable Compound (A)>

The polymerizable compound (A) polymerizes by the action of the polymerization initiator (B) on the surface of the object to be treated and forms a resin coating favorably attached to the surface of the object to be treated. The polymerizable compound (A) includes a polymerizable betaine compound (A1) and an adhesive polymerizable compound (A2). The polymerizable betaine compound (A1) has an ethylenic unsaturated double bond and a betaine structure. The adhesive polymerizable compound (A2) has an ethylenic unsaturated double bond and at least one adhesive group selected from the group consisting of a hydrolysable silyl group, an amino group, a carboxy group, a mercapto group, a cyano group and a hydroxyl group. In addition, the polymerizable compound (A) may include, in addition to the polymerizable betaine compound (A1) and the adhesive polymerizable compound (A2), a polyfunctional monomer (A3) or an extra monomer (A4) to an extent that the objective of the present invention is not impaired. It is considered that, when the polymerizable compound (A) includes a polymerizable betaine compound (A1) and an adhesive polymerizable compound (A2), at the time of a surface treatment, first, these compounds strongly bond to the surface of the object to be treated, and a polymerization reaction of the polymerizable compound (A) proceeds in the vicinity of the surface of the object to be treated from these compounds bonding to the surface of the object to be treated as starting points. In addition, the polymerizable composition includes inorganic fine particles (C) having a functional group capable of forming a covalent bond with a polymer of the polymerizable compound (A). Therefore, the polymerization of the polymerizable compound (A) proceeds while the polymerizable compound (A) remains bonded to the surfaces of the inorganic fine particles (C). It is considered that a thick hydrophilic coating having high hardness composed of the polymer of the polymerizable compound (A), which is strongly bonded to the surface of the object to be treated, and the inorganic fine particles (C) is formed.

[Polymerizable Betaine Compound (A1)]

The polymerizable compound (A) includes a polymerizable betaine compound (A1) having a betaine structure including a cationic group and an anionic group and a group having an ethylenic unsaturated double bond. Both the cationic group and the anionic group act as the hydrophilic group. The surface of the surface-treated object to be treated may come into contact with a washing liquid including a large amount of an anion having a hydrophobic group or cation having a hydrophobic group. In a case where a resin in the surface treatment liquid has only an anionic group such as a carboxy group, a carboxylate group, a sulfonic acid group or a sulfonate group as the hydrophilic group, this hydrophilic group may stop acting as a hydrophilic group due to an interaction with a cation having a hydrophobic group. In addition, in a case where the resin in the surface treatment liquid has only a cationic group such as a quaternary ammonium group as the hydrophilic group, the cationic group may stop acting as a hydrophilic group due to an interaction with an anion having a hydrophobic group. However, since a polymer of the polymerizable compound (A) including the polymerizable betaine compound (A1) has both a cationic group and an anionic group as the hydrophilic group, even when the surface of the surface-treated object to be treated comes into contact with a washing agent abundantly including a cation having a hydrophobic group or comes into contact with a washing agent abundantly including an anion having a hydrophobic group, any one of the cationic group and the anionic group is capable of maintaining the action as the hydrophilic group, and the hydrophilicity of the surface of the object to be coated is unlikely to deteriorate.

The number of the cationic groups and the number of the anionic groups in the polymerizable betaine compound (A1) are not particularly limited. In the polymerizable betaine compound (A1), the number of the cationic groups and the number of the anionic groups are preferably the same as each other. The number of the cationic groups and the number of the anionic groups in the polymerizable betaine compound (A1) are each preferably one since the synthesis or procurement of the polymerizable betaine compound (A1) is easy.

In the polymerizable betaine compound (A1), for example, the group having an ethylenic unsaturated double bond, the cationic group and the anionic group preferably bond together in this order through linking groups as necessary.

The cationic group is preferably a cationic group that is a quaternary ammonium cation. The anionic group is preferably a sulfonic acid anion group, a phosphonic acid anion group, or a carboxylic acid anion group.

Examples of the group having an ethylenic unsaturated double bond in the polymerizable betaine compound (A1) include an alkenyl group such as a vinyl group, a 1-propenyl group, a 2-n-propenyl group (an allyl group), a 1-n-butenyl group, a 2-n-butenyl group, and a 3-n-butenyl group. Among these groups, the vinyl group, and the 2-propenyl group (the allyl group) are preferred. In the polymerizable betaine compound, a number of the ethylenic unsaturated double bond is not particularly limited, and preferably 1 or 2.

As the polymerizable betaine compound (A1), for example, compounds represented by the following formula (a1-i) or formula (a1-ii). The polymerizable betaine compound represented by the following formula (a1-i) or formula (a1-ii) include a cationic group having $N^+$ and an anionic group as R. Both the cationic group and the anionic group act as the hydrophilic group.

[Chem. 1]

(a1-i)

In the formula (a1-i), $R^1$ is a hydrocarbon group having an ethylenic unsaturated double bond, $R^2$ is a divalent hydrocarbon group having 1 or more and 10 or less carbon atoms, R is an anionic group, and ring A is a heterocycle.

[Chem. 2]

(a1-ii)

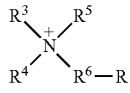

In the formula (a1-ii), $R^3$, $R^4$, and $R^5$ are each independently a hydrocarbon group having an ethylenic unsaturated double bond, or a hydrocarbon group having 1 or more and 10 or less carbon atoms, at least one of $R^3$, $R^4$, and $R^5$ is the hydrocarbon group having the ethylenic unsaturated double bond, $R^6$ is a divalent hydrocarbon group having 1 or more and 10 or less carbon atoms, and R is an anionic group.

In the formula (a1-i), a vinyl group, an alkenyl group such as a 1-propenyl group, a 2-n-propenyl group (an allyl group), a 1-n-butenyl group, a 2-n-butenyl group, and 3-n-butenyl group is exemplified as the hydrocarbon group having the ethylenic unsaturated double bond as $R^1$.

In the formula (a1-i), as the divalent hydrocarbon group as $R^2$, an alkylene group, an arylene group, and a group consisting of an alkylene group and an arylene group are exemplified, and the alkylene group is preferable. Specific examples of the alkylene group as R2 include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

In the formula (a1-i), the heterocycle as the ring A may be an aromatic heterocycle or an aliphatic heterocycle. Examples of the aromatic heterocycle include nitrogen-containing aromatic heterocycles such as an imidazole ring, a pyrazole ring, a 1,2,3-triazole ring, a 1,2,4-triazole ring, a pyridine ring, a pyrimidine ring, a pyridazine ring and a pyrazine ring in which one arbitrary nitrogen atom in the nitrogen-containing aromatic heterocycle is quaternized. Examples of the aliphatic heterocycle include nitrogen-containing heterocycles such as a pyrrolidine ring, a piperidine ring and a piperazine ring in which one arbitrary nitrogen atom in the nitrogen-containing heterocycle is quaternized.

In the formula (a1-ii), examples of the hydrocarbon group having the ethylenic unsaturated double bond as $R^3$ to $R^5$ include an alkenyl group such as a vinyl group, a 1-propenyl group, a 2-propenyl group (an allyl group), a 1-n-butenyl group, a 2-n-butenyl group, a 3-n-butenyl group.

In the formula (a1-ii), as the hydrocarbon group as $R^3$ to $R^5$, an alkyl group, an aryl group, and an aralkyl group are exemplified, and the aralkyl group is preferable. The hydrocarbon group as $R^3$ to $R^5$ may have a substituent. The substituent that the hydrocarbon group as $R^3$ to $R^5$ may have is not particularly limited as long as the objective of the present invention is not impaired. Examples of the substituent include a halogen atom, a hydroxy group, an alkoxy group having 1 or more and 4 or less carbon atoms, an acyl group having 2 or more and 4 or less carbon atoms, an acyloxy group having 2 or more and 4 or less carbon atoms, an amino group, an alkylamino group substituted with one or two alkyl groups having 1 or more and 4 or less carbon atoms. Specific suitable examples of the alkyl group as $R^3$ to $R^5$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, and an n-decyl group.

In the formula (ai-ii), as a divalent hydrocarbon group as $R^6$, an alkylene group, an arylene group, and a group consisting of an alkylene group and an arylene group are exemplified, and the alkylene group is preferable. Specific examples of the alkylene group as $R^6$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

As the polymerizable betaine compound having a sulfonic acid anion group as the anionic group, a monomer represented by the following formula (a1-iii) or (a1-iv) is preferable.

[Chem. 3]

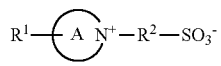

(a1-iii)

In the formula (a1-iii), $R^1$, $R^2$, and ring A are the same as $R^1$, $R^2$, and ring A in the formula (a1-i).

[Chem. 4]

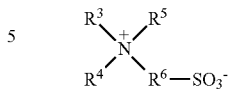

(a1-iv)

In the formula (a1-iv), $R^3$, $R^4$, $R^5$, and $R^6$ are the same as $R^3$, $R^4$, $R^5$, and $R^6$ in the formula (a1-ii).

As the monomer represented by the formula (a1-iii) or (a1-iv), a monomer represented by the following formula (a1-v), (a1-vi), or (a1-vii) is exemplified.

[Chem. 5]

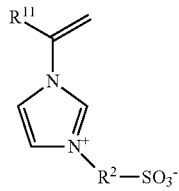

(a1-v)

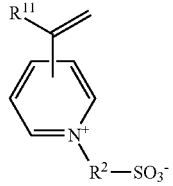

(a1-vi)

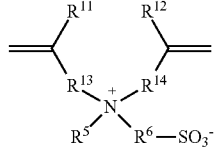

(a1-vii)

In the formula (ai-v), (ai-vi), and (a1-vii), $R^2$ is the same as the $R^2$ in the formula (a1-iii), $R^5$ and $R^6$ are the same as the $R^5$ and $R^6$ in the formula (ai-iv), $R^{11}$ and $R^{12}$ are each independently a hydrogen atom or a methyl group, and $R^{13}$ and $R^{14}$ are each independently a single bond, or an alkylene group having 1 or more and 4 or less carbon atoms.

In the formula (a1-v), (a1-vi), and (a1-vii), as the alkylene group as $R^{13}$ and $R^{14}$, a methylene group, an ethane-1,2-diyl group, a propane-1.3-diyl group, a propane-1,2-diyl group, and a butane-1,4-diyl group are exemplified.

As the polymerizable betaine compound having the anionic group such as a phosphonic acid anion group and a carboxy acid anion group, the monomer represented by the above formula (a1-ii) or (a1-iv), or a monomer where the sulfonic acid anion group ($-SO_3^-$) in the monomer represented by the above formula (a1-v), (a1-vi), or (a1-vii) is replaced by the phosphonic acid anion group ($-(P3)2-$) or the carboxylic acid anion group ($-COO^-$) is exemplified.

Specific examples of the polymerizable betaine compound represented by the formula (a1-i) or the formula (a1-ii) include compounds of the following formulae and monomers obtained by substituting the sulfonic acid anionic group ($-SO_3^-$) in the compounds of the following formulae with a phosphonic acid anionic group ($-(PO_3)^{2-}$) or a carboxylic acid anionic group ($-COO^-$).

[Chem. 6]

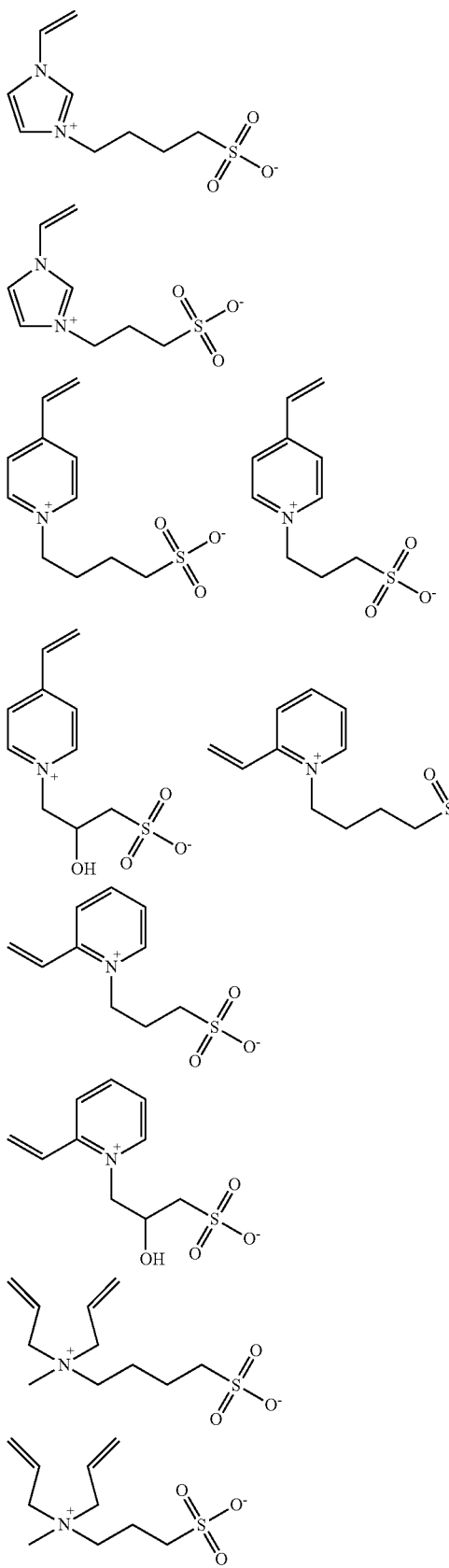

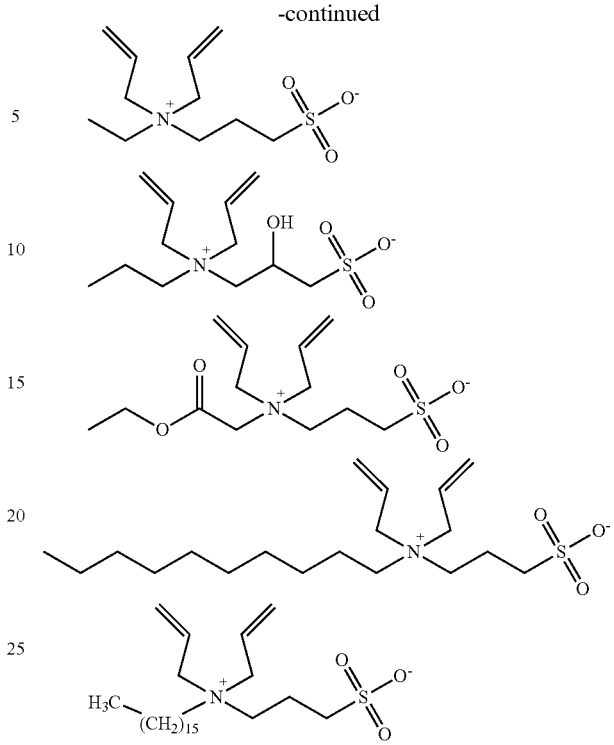

The polymerizable betaine compound represented by the formula (a1-i) or the formula (a1-ii) can be synthesized by a well-known reaction. For example, the polymerizable betaine compound can be obtained by reacting a compound having an anionic group with a compound having groups that serve as a group having an ethylenic unsaturated double bond and a cationic group. Specifically, for example, the compound represented by the formula (a1-ii) can be obtained by reacting the following compound and a sultone in a solvent. Examples of the sultone include sultones of 4-membered ring or more and 10-membered ring or less, and 1,3-propane sultone and 1,4-butane sultone are preferable.

[Chem. 7]

In the formula, $R^1$ is the same as $R^1$ in the (a1-i), and the ring A is a heterocycle.

In addition, a compound represented by the following formula (A1-viii) is also preferable as the polymerizable betaine compound (A1). The polymerizable betaine compound (A1) represented by the following formula (a1-viii) having a cationic group including N+ and an anionic group as $R^{20}$. Both the cationic group and the anionic group act as the hydrophilic group.

$$CH_2=CR^{15}-CO-NH-R^{16}-N^+(R^{17})(R^{18})-R^{19}-R^{20} \quad \text{(a1-viii)}$$

In the formula (a1-viii), $R^{15}$ is a hydrogen atom or a methyl group, $R^{16}$ and $R^{19}$ are each independently a divalent hydrocarbon group having 1 or more and 10 or less carbon atoms, $R^{17}$ and $R^{18}$ are each independently an optionally substituted hydrocarbon group having 1 or more and 10 or less carbon atoms, and R20 is a sulfonic acid anion group (—SO$_3^-$), a phosphonic acid anion group (—(PO$_3$)$^{2-}$), or a carboxylic acid anion group (—COO$^-$).

In the formula (a1-viii), the divalent hydrocarbon group as R$^{16}$ and R$^{19}$, an alkylene group, an arylene group, and a group consisting of an alkylene group and an arylene group are exemplified, and the alkylene group is preferable. Specific examples of the alkylene group as R$^{16}$ and R$^{19}$ include, a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

In the formula (a1-viii), the hydrocarbon group as R$^{17}$ and R$^{18}$, an alkyl group, an aryl group, and an aralkyl group are exemplified, and the aralkyl group is preferable. The hydrocarbon group as R$^{17}$ and R$^{18}$ may have a substituent. The substituent that the hydrocarbon group as R$^{17}$ and R$^{18}$ may have is not particularly limited as long as the objective of the present invention is not impaired. Examples of the substituent include a halogen atom, a hydroxy group, an alkoxy group having 1 or more and 4 or less carbon atoms, an acyl group having 2 or more and 4 or less carbon atoms, an acyloxy group having 2 or more and 4 or less carbon atoms, an amino group, an alkylamino group substituted with one or two alkyl groups having 1 or more and 4 or less carbon atoms. Specific suitable examples of the alkyl group as R$^{17}$ and R$^{18}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, and an n-decyl group.

In the formula (a1-viii), R$^{20}$ is a sulfonic acid anion group (—SO$_3^-$), a phosphonic anion group (—PO$_3^{2-}$) or a carboxylic acid anion group (—COO$^-$), and the sulfonic acid anion group (—SO$_3^-$) is preferable.

Suitable examples of the N-substituted (meth)acrylamide represented by the formula (a1-viii) include the following compounds. In the following formulas, R$^{15}$ is a hydrogen atom or a methyl group.

[Chem. 9]

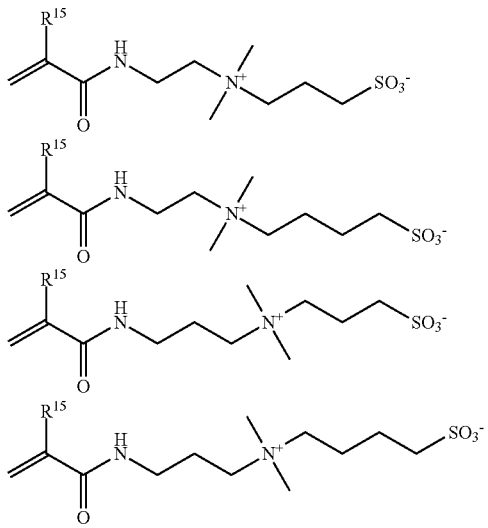

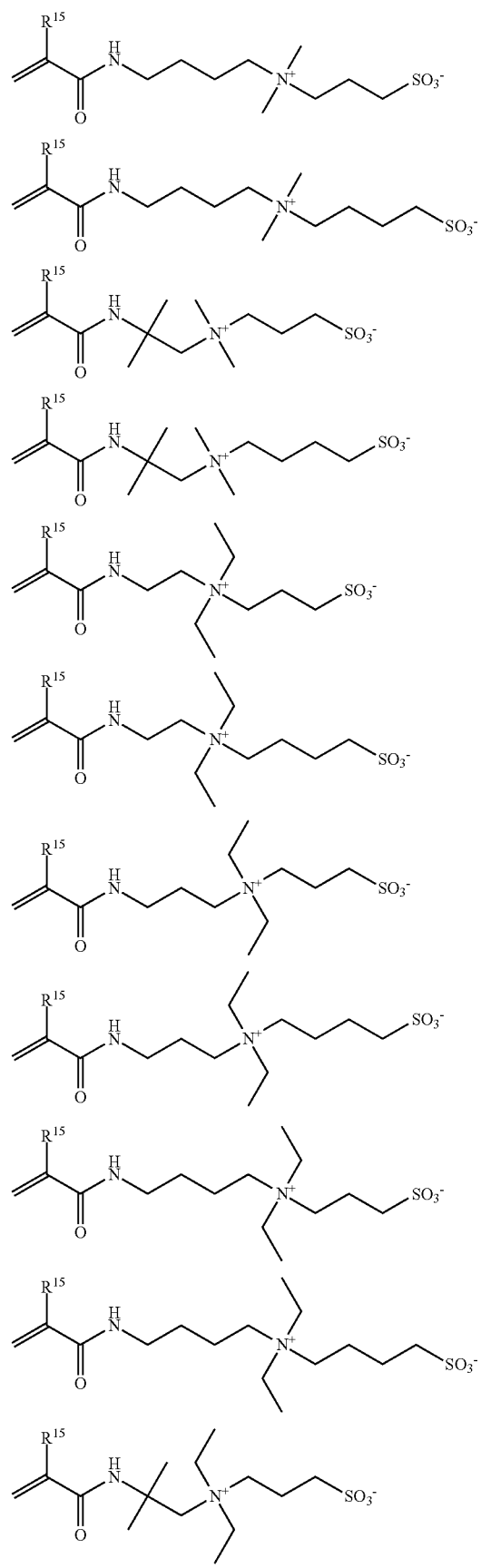

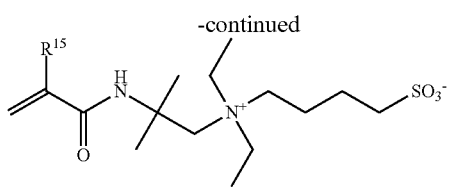

The content of the polymerizable betaine compound (A1) in the polymerizable compound (A) is not particularly limited as long as the objective of the present invention is not impaired. From the viewpoint of satisfying both a favorable hydrophilization effect and the favorable adhesion of the resin coating to be formed to the surface of the object to be treated, the ratio of the mass of the polymerizable betaine compound (A1) with respect to the mass of the polymerizable compound (A) is preferably 50% by mass or more and 99.9% by mass or less, more preferably 60% by mass or more and 99.9% by mass or less, still more preferably 70% by mass or more and 99.9% by mass or less, far still more preferably 90% by mass or more and 99.9% by mass or less and particularly preferably 95% by mass or more and 99.9% by mass or less.

[Adhesive Polymerizable Compound (A2)]

The polymerizable compound (A) includes an adhesive polymerizable compound (A2) together with the polymerizable betaine compound (A1). The adhesive polymerizable compound (A2) has an ethylenic unsaturated double bond and one or more adhesive groups selected from the group consisting of a hydrolyzable silyl group, an amino group (—NH$_2$), a carboxy group, a mercapto group, a cyano group, and a hydroxy group. The hydrolyzable silyl group reacts with the surface of the object to be treated to form a covalent bond and thereby strongly bonds a coating that is formed using the polymerizable composition to the surface of the object to be treated. In addition, the amino group (—NH$_2$), the carboxy group, the mercapto group, the cyano group and the hydroxyl group are polar groups and strongly bond the coating that is formed using the polymerizable composition to the surface of the object to be treated based on the polarity.

Preferable examples of the adhesive polymerizable compound (A2) include an unsaturated group-containing silicon compound (A2-1) having an ethylenic unsaturated double bond and a hydrolysable silyl group and a polar polymerizable compound (A2-2) having an ethylenic unsaturated double bond and at least one polar group selected from an amino group (—NH$_2$), a carboxy group, a mercapto group, a cyano group and a hydroxyl group.

(Unsaturated Group-Containing Silicon Compound (A2-1))

The unsaturated group-containing silicon compound (A2-1) has a group having an ethylenic unsaturated double bond and a hydrolysable silyl group.

The group having the ethylenic unsaturated double bond is not particularly limited as long as the unsaturated group-containing silicon compound (A2-1) is polymerizable with the polymerizable betaine compound (A1). Suitable examples of the group having the ethylenic unsaturated double bond include an alkenyl group such as a vinyl group, a 1-propenyl group, a 2-propenyl group (an allyl group), a 1-n-butenyl group, a 2-n-butenyl group and a 3-n-butenyl group; a monoalkenylamino group such as an N-vinylamino group, an N-1-propenylamino group, an N-allylamino group, an N-1-n-butenylamino group, an N-2-n-butenylamino group, and an N-3-n-butenylamino group; a dialkenylamino group such as an N,N-divinylamino group, an N,N-di(1-propenyl)amino group, an N,N-diallylamino group, an N,N-di(1-n-butenyl)amino group, an N,N-di(2-n-butenyl)amino group, an N,N-di(3-n-butehyl)amino group; an alkenyloxy group such as an allyloxy group, a 2-n-butenyloxy group, and 3-n-butenyloxy group; an alkenylaminocarbonyl group such as a vinylaminocarbonyl group, a 1-propenylaminocarbonyl group, an allylaminocarbonyl group, a 1-n-butenylaminocarbonyl group, a 2-n-butenylaminocarbonyl group, and a 3-n-butenylaminocarbonyl group; an alkenyloxycarbonyl group such as a vinyloxycarbonyl group, a 1-propenyloxycarbonyl group, an allyloxycarbonyl group, a 1-n-butenyloxycarbonyl group, a 2-n-butenyloxycarbonyl group, and a 3-n-oxycarbonyl group, a (meth)acryloyl group-containing group such as an acryloyl group, a methacryloyl group, an acryloyloxy group, a methacryloyloxy group, an acryloylamino group and a methacryloylamino group. Among these groups, the alkenyl group, and the (meth)acryloyl group-containing group are preferable. A number of carbon atoms of the alkenyl group is, for example, preferably 2 or more and 6 or less, and more preferably 2 or 3.

The hydrolyzable silyl group is a silyl group capable of forming a silanol group by hydrolysis. Suitable examples of the hydrolyzable silyl group include a group represented by —SiR$^{01}_a$R$^{02}_{3-a}$. Here, R$^{01}$ is a group capable of forming a silanol group by hydrolysis such as an alkoxy group and a halogen atom. The alkoxy group is preferably an alkoxy group having 1 or more and 4 or less carbon atoms such as a methoxy group, an ethoxy group, an n-propyloxy group, an isopropyloxy group, and n-butyloxy group. The halogen atom is preferably a chlorine atom, and a bromine atom, and more preferably a chlorine atom. R$^{02}$ may be various organic groups not corresponding to the group capable of forming a silanol group by hydrolysis as long as the objective of the present invention is not impaired. The organic group is preferably a hydrocarbon group having 1 or more and 10 or less carbon atoms. The hydrocarbon group may be an aliphatic group or an aromatic group. The structure of the hydrocarbon group may be linear, branched, cyclic or a combination thereof. Suitable examples of the hydrocarbon group having 1 or more and 10 or less carbon atoms include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decyl group, a phenyl group, a naphthalene-1-yl group, a naphthalene-2-yl group, a benzyl group and a phenethyl group. Among these, the methyl group, and the ethyl group are preferred. The above-described hydrocarbon group may have a substituent such as an alkoxy group having 1 or more and 6 or less carbon atoms, a halogen atom, a hydroxy group, and a cyano group. a is preferably 2 or 3, and more preferably 3. In addition, in a case where a is two or three, a condensation reaction is likely to occur even between the groups represented by —SiR$^{01}_a$R$^{02}_{3-a}$ present adjacent to each other on the surface of the object to be treated. As a result, a network of siloxane bonds that spreads along the surface of the object to be treated is formed in the coating that is formed using the polymerizable composition, which makes it easy to particularly strongly bond the polymer of the polymerizable compound (A) to the surface of the object to be treated.

Specific examples of the hydrolyzable silyl group represented by —SiR$^{01}_a$R$^{02}_{3-a}$ include a trimethoxysilyl group, a triethoxysilyl group, a methyldimethoxysilyl group, an ethyldimethoxysilyl group, a methyldiethoxysilyl group, and an ethyldiethoxysilyl group.

For example, the unsaturated group-containing silicon compound (A2-1) is preferably a compound represented by the following formula (a2-1).

$$R^{03}-(-CO-R^{04}-)_b-R^{05}-SiR^{01}_aR^{02}_{3-a} \quad (a2\text{-}1)$$

In the formula (a2-1), $R^{01}$, $R^{02}$ and a are as described above for the hydrolyzable silyl group. $R^{03}$ is an alkenyl group having 2 or more and 6 or less carbon atoms. $R^{04}$ is —O— or —NH—. $R^{05}$ is a single bond, an alkylene group having 1 or more and 10 or less carbon atoms, an aromatic hydrocarbon group having 1 or more and 10 or less carbon atoms, or a nitrogen-containing heterocyclic group having 1 or more and 10 or less carbon atoms. b is 0 or 1.

$R^{03}$ is an alkenyl group having 2 or more and 6 or less carbon atoms. Suitable examples of the alkenyl group include a vinyl group, a 1-methylvinyl group, an allyl group, a 3-butenyl group, a 4-pentenyl group, and a 5-hexenyl group. When b is 1, $R^{03}$ is preferably the vinyl group or the 1-methylvinyl group. In other words, when b is 1, it is preferable that the group represented by $R^{03}$—CO—$R^{04}$— is an acryloyloxy group, an acryloylamino group, a methacryloyloxy group, or a methacryloylamino group.

The alkylene group as $R^{05}$ include a methylene group, an ethane-1,2-diyl group, a propane-1,3-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group. The aromatic hydrocarbon group as $R^{05}$ include p-phenylene group, m-phenylene group, o-phenylene group, a naphthalene-2,6-diyl group, a naphthalene-2,7-diyl group, a biphenyl-4,4'-diyl group, a biphenyl-3,4'-diyl group, and a biphenyl-3,3'-diyl group.

Specific examples of the nitrogen-containing heterocyclic group as $R^{05}$ include the group in which two hydrogen atoms are removed from the following heterocycles. Examples of the nitrogen-containing heterocycle include 5-membered ring such as a pyrrolidine ring, a pyrazolidine ring, an imidazolidine ring, a triazolidine ring, a tetrazolidine ring, a pyrroline ring, a pyrazoline ring, an imidazoline ring, a triazoline ring, a tetrazoline ring, a pyrrole ring, a pyrazole ring, an imidazole ring, a triazole, and a tetrazole ring; a nitrogen-containing 6-membered ring such as a piperidine ring, a piperideine ring, a piperazine ring, a triazinane ring, a tetradinane ring, a pentazinane ring, a pyridine ring, a pyridazine ring, a pyrimidine ring, a pyrazine ring, a triazine ring, a tetrazine ring, and a pentazine ring; a nitrogen-containing 7-membered ring such as an azepane ring, a diazepane ring, a triazepane ring, a tetrazepam ring, an azepine ring, a diazepine ring, and a triazepine ring; a nitrogen-containing condensed polycycle such as an indole ring, an indolenine ring, an indoline ring, an isoindole ring, an isoindolenine ring, isoindoline ring, a benzimidazole ring, an indolizine ring, a purine ring, an indolizidine ring, a benzodiazepine ring, a quinoline ring, an isoquinoline ring, a quinolizidine ring, a quinoxaline ring, a cinnoline ring, a quinazoline ring, a phthalazine ring, a naphthyridine ring, and a pteridine ring.

Suitable examples of the silane compound represented by the formula (a2-1) include a silane compound including an unsaturated group such as a vinyltrimethoxysilane, a vinyltriethoxysilane, an allyltrimethoxysilane, and an allyltrimethoxysilane; a silane compound including a (meth) acryloxy group such as 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, and 3-acryloxypropyltriethoxysilane.

(Polar Polymerizable Compound (A2-2))

A polar polymerizable compound (A2-2) has a group having an ethylenic unsaturated double bond, and a polar group selected from the group consisting of an amino group, a carboxy group, a mercapto group, a cyano group, and a hydroxy group.

A compound represented by the following formula (A2-2) is preferable as the polar polymerizable compound (A2-2).

$$CH_2=CR^{41}-(R^{42})_c CO-R^{43} \quad (a2\text{-}2)$$

In the formula (a2-2), $R^{41}$ is a hydrogen atom, or a methyl group, $R^{42}$ is a divalent hydrocarbon group, c is 0 or 1, $R^{43}$ is —OH, —$OR^{44}$, or —NH—$R^{44}$, $R^{44}$ is a hydrocarbon group substituted with at least one polar group selected form the group consisting of an amino group, a carboxy group, a mercapto group, a cyano group, and a hydroxy group.

In the above formula (a2-2), $R^{42}$ is a divalent hydrocarbon group. A number of carbon atoms of the divalent hydrocarbon atom is not particularly limited as long as the objective of the present invention is not impaired. A number of carbon atoms of the divalent hydrocarbon group as $R^{42}$ is preferably 1 or more and 20 or less, more preferably 1 or more and 12 or less, particularly preferably 1 or more and 10 or less, and most preferably 1 or more and 6 or less, since the compound represented by the formula (a2-2) is easily prepared and easily available.

The divalent hydrocarbon group as $R^{42}$ may be an aliphatic group, an aromatic group or a hydrocarbon group including an aliphatic portion and an aromatic portion. In a case where the divalent hydrocarbon group is an aliphatic group, the aliphatic group may be a saturated aliphatic group or an unsaturated aliphatic group. In addition, the structure of the aliphatic group may be linear, branched, cyclic or a combination of these structures.

Suitable specific examples of the $R^{42}$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, a m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^{43}$ is —OH, —$OR^{44}$, or —NH—$R^{44}$. $R^{44}$ is a hydrocarbon group substituted with one or more polar group selected from the group consisting of an amino group, a carboxy group, a mercapto group, a cyano group and a hydroxy group. The hydrocarbon group constituting a main skeleton of the group of $R^{44}$ may be a linear, branched, or cyclic aliphatic group, or an aromatic hydrocarbon group. A number of carbon atoms of the linear, branched, or cyclic aliphatic group is preferably 1 or more and 20 or less, and more preferably 1 or more and 12 or less. Suitable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Suitable examples of the cyclic aliphatic group include a cycloalkyl group such as a cyclopropyl group, a cyclobutyl group, a cyclopentyl group, a cyclohexyl group, and a cyclooctyl group; a group in which one hydrogen atom is removed from polycycloalkane such as adamantane, norbornane, isobornane, tricyclodecane, and tetracyclododecane, or a group in which one hydrogen atom is removed from C1-C4 alkyl substitute of these polycycloalkanes. Specific examples of the aromatic hydrocarbon group include a phenyl group, a naphthyl group, an anthranyl group, a phenanthrenyl group, a biphenylyl group, and the like. The aromatic hydrocarbon group is optionally substituted with a C1-C4 alkyl group such as a methyl group, and an ethyl group.

Specific examples of the compound represented by the formula (a2-2) include the following compounds.

[Chem. 9]

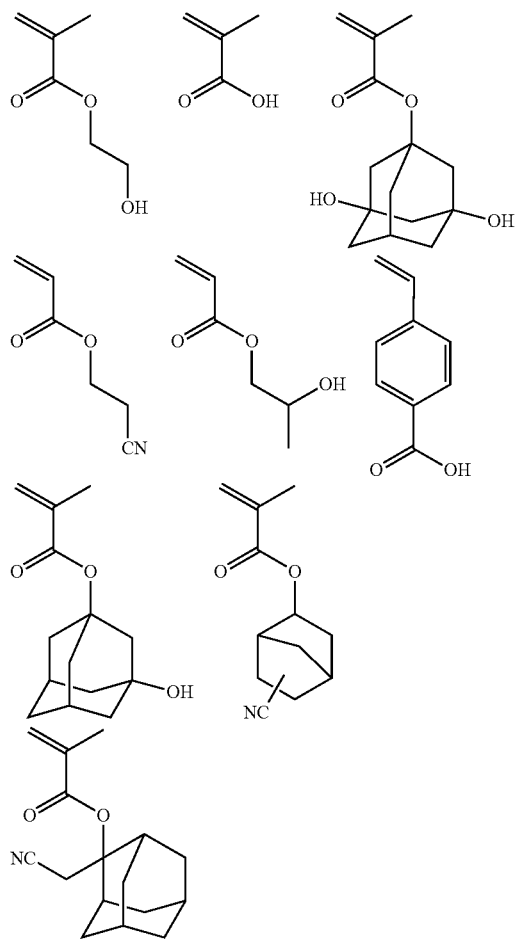

As the polar polymerizable compound (A2-2), a compound represented by the following formula (a2-3) is also preferred.

(R$^{3a}$—R$^{2a}$)$_n$—X—R$^{1a}$  (a2-3)

In the formula (a2-3), R$^{1a}$ is an organic group having an ethylenic unsaturated double bond, R$^{2a}$ is a single bond, or an alkylene group having 1 or more and 10 or less carbon atoms, R3a is a hydrogen atom or a polar group selected from the group consisting of an amino group, a carboxy group, a mercapto group, a cyano group and a hydroxy group, n is 1 or 2, and X is a nitrogen-containing heterocyclic group having a valency of n+1. When n is 1, R$^{3a}$ is the polar group. When n is 2 at least one R$^{3a}$ is the polar group.

In the formula (a2-3), R$^{1a}$ is an organic group having one or more ethylenic unsaturated double bond. Suitable examples of the organic group having one or more ethylenic unsaturated double bond include groups represented by the following formulas (a2-3i) to (a2-3vii). In the formulas (a2-3i) to (a2-3vi), R$^{a01}$ is an alkenyl group having 1 or more and 10 or less carbon atoms, and R$^{a02}$ is a hydrocarbon group having 1 or more and 10 or less carbon atoms.

—R$^{a01}$  (a2-3i)

—NH—R$^{a01}$  (a2-3ii)

—N(R$^{a01}$)(R$^{a02}$)  (a2-3iii)

—N(R$^{a01}$)$_2$  (a2-3iv)

—O—R$^{a01}$  (a2-3v)

—CO—NH—R$^{a01}$  (a2-3vi)

—CO—O—R$^{a01}$  (a2-3vii)

A number of carbon atoms of the alkenyl group as R$^{a01}$ is preferably 1 or more and 6 or less, and more preferably 1 or more and 4 or less. The alkenyl group as R$^{a01}$ may be a linear alkenyl group or a branched alkenyl group. The hydrocarbon group as R$^{a02}$ may be an aliphatic group, an aromatic group, or a combination of an aliphatic group and an aromatic group. number of carbon atoms of the hydrocarbon group as R$^{a02}$ is preferably 1 or more and 6 or less, more preferably 1 or more and 4 or less, and further preferably 1 or more and 3 or less.

Specific examples of the organic group having one or more ethylenic unsaturated double bond as R$^{1a}$ include, an alkenyl group such as a vinyl group, a 1-propenyl group, a 2-propenyl group (an allyl group), a 1-n-butenyl group, a 2-n-butenyl group, and a 3-n-butenyl group; a monoalkenylamino group such as an N-vinylamino group, an N-1-propenylamino group, an N-allylamino group, an N-1-n-butenylamino group, an N-2-n-butenyl amino group, and an N-3-n-butenylamino group; a dialkenylamino group such as an N,N-divinylamino group, an N,N-di(1-propenyl)amino group, an N,N-diallylamino group, an N,N-di(1-n-butenyl) amino group, an N,N-di(2-n-butenyl)amino group, and an N,N-di(3-n-butenyl)amino group; an alkenyloxy group such as a allyloxy group, a 2-n-butenyloxy group, and a 3-n-butenyloxy group; an alkenylaminocarbonyl group such as a vinylaminocarbonyl group, a 1-propenylaminocarbonyl group, an allylaminocarbonyl group, a 1-n-butenylaminocarbonyl group, a 2-n-butenylaminocarbonyl group, and a 3-n-butenylaminocarbonyl group; an alkenyloxycarbonyl group such as a vinyloxycarbonyl group, a 1-propenyloxycarbonyl group, an allyloxycarbonyl group, a 1-n-butenyloxycarbonyl group, a 2-n-butenyloxycarbonyl group, and a 3-n-butenyloxycarbonyl group; a (meth)acryloyl group-containing group such as an acryloyl group, a methacryloyl group, an acryloyloxy group, a methacryloyloxy group, an acryloylamino group, and a methacryloylamino group. Among these groups, the vinyl group, the allyl group, the N,N-diallylamino group, the allyloxy group, the acryloyl group, the methacryloyl group, the acryloyloxy group, and the methacryloyloxy group are preferable, and the N,N-diallylamino group is more preferable.

In the formula (a2-3), R$^{2a}$ is a single bond, or an alkylene group having 1 or more and 10 or less carbon atoms. A number of carbon atoms of the alkylene group is preferably 1 or more and 6 or less, more preferably 1 or more and 4 or less, and further preferably 1 or more and 3 or less. Specific examples of the alkylene group having 1 or more and 10 or less carbon atoms include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, and an n-decane-1,10-diyl group. Among these alkylene groups, the methylene group, the ethane-1,2-diyl group, and the propane-1,3-diyl group are preferable, and the methylene group, and the ethane-1,2-diyl group are more preferable.

In the formula (a2-3), X is a (n+1)-valent nitrogen-containing heterocycle. n is one or two. The nitrogen-containing heterocycle may be an aromatic group or an aliphatic group. The nitrogen-containing heterocycle may be a monocycle or a condensed polycycle in which a monocyclic nitrogen-containing heterocycle bonds to one or more monocycles selected from a monocyclic aromatic hydrocarbon ring and a monocyclic nitrogen-containing heterocycle. In addition, the nitrogen-containing heterocycle may be a ring in which two or more rings selected from a monocyclic nitrogen-containing heterocycle and a condensed polycyclic nitrogen-containing heterocycle bond together through a single bond.

In the formula (a2-3), the group represented by $R^{1a}$ and a group represented by $R^{3a}$—$R^{2a}$— may bond onto a carbon atom as a ring constituent atom of the nitrogen-containing heterocycle represented by X or may bond onto a nitrogen atom as a ring constituent atom.

Specific examples of the nitrogen-containing heterocycle giving X include a nitrogen-containing 5-membered ring such as a pyrrolidine ring, a pyrazolidine ring, an imidazolidine ring, a triazolidine ring, a tetrazolidine ring, a pyrroline ring, a pyrazoline ring, an imidazoline ring, a triazoline ring, a tetrazoline ring, a pyrrole ring, a pyrazole ring, an imidazole ring, a triazole, and a tetrazole ring; a nitrogen-containing 6-membered ring such as a piperidine ring, a piperideine ring, a piperazine ring, a triazinane ring, a tetradinane ring, a pentazinane ring, a pyridine ring, a pyridazine ring, a pyrimidine ring, a pyrazine ring, a triazine ring, a tetrazine ring, and a pentazine ring; a nitrogen-containing 7-membered ring such as an azepane ring, a diazepane ring, a triazepane ring, a tetrazepam ring, an azepine ring, a diazepine ring, and a triazepine ring; a nitrogen-containing condensed polycycle such as an indole ring, an indolenine ring, an indoline ring, an isoindole ring, an isoindolenine ring, isoindoline ring, a benzimidazole ring, an indolizine ring, a purine ring, an indolizidine ring, a benzodiazepine ring, a quinoline ring, an isoquinoline ring, a quinolizidine ring, a quinoxaline ring, a cinnoline ring, a quinazoline ring, a phthalazine ring, a naphthyridine ring, and a pteridine ring; a polycycle in which two or more rings selected from these nitrogen-containing heterocycles are joined via a single bond. X derived from the nitrogen-containing heterocycle is preferably a divalent or trivalent group including a nitrogen-containing 6-membered ring, more preferably a divalent or trivalent group including a triazine ring, and further preferably a 1,3,5-triazine-2,4-diyl group and a 1,3,5-triazine-2,4,6-triyl group in view of good adhesion of the polymer of the polymerizable compound (A) to the surface of the object to be treated.

Specific examples of the divalent or trivalent nitrogen-containing heterocycle as X include the following groups.

[Chem. 10]

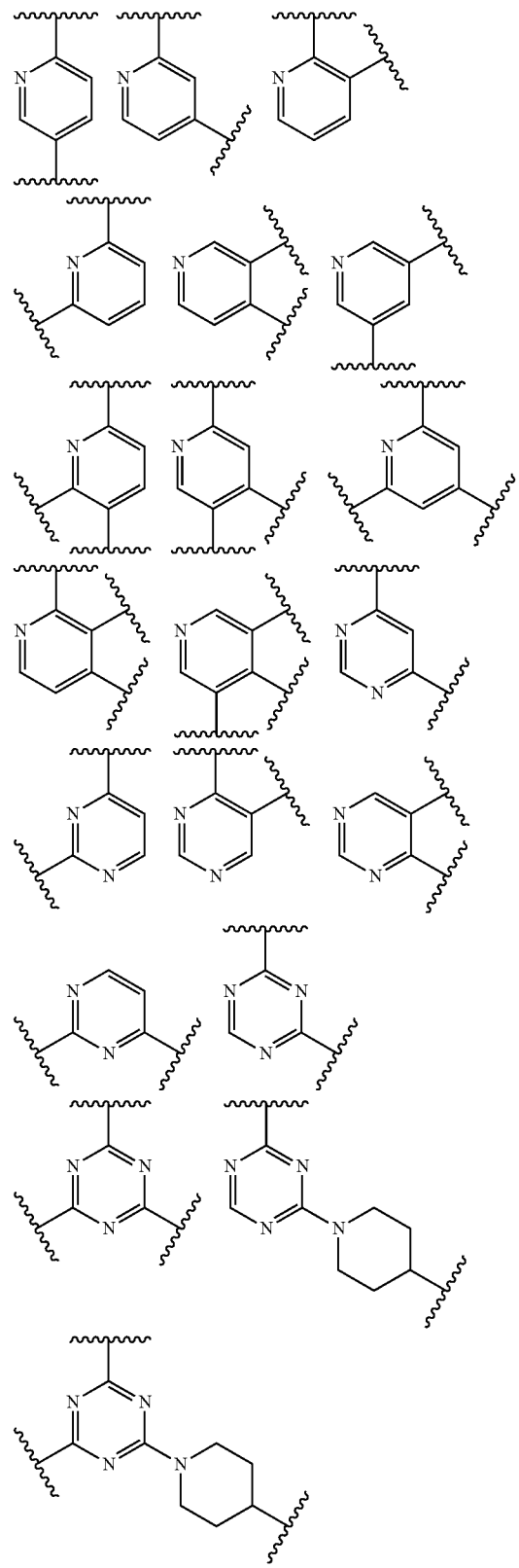

Specific examples of the compound represented by the formula (a2-3) include the following compounds.

[Chem. 11]
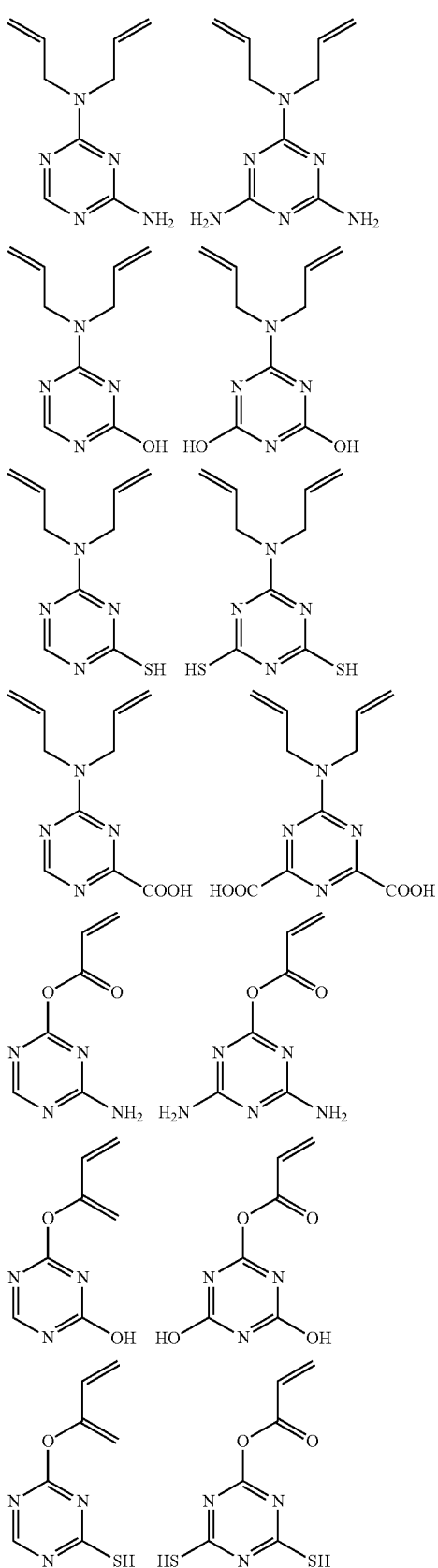
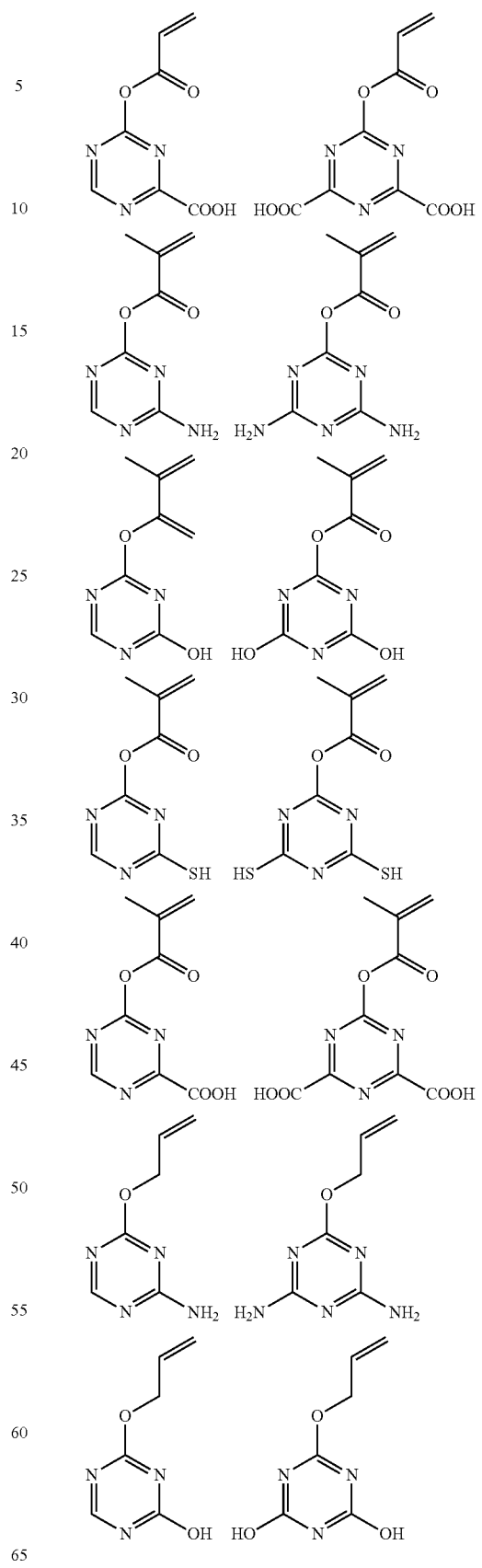

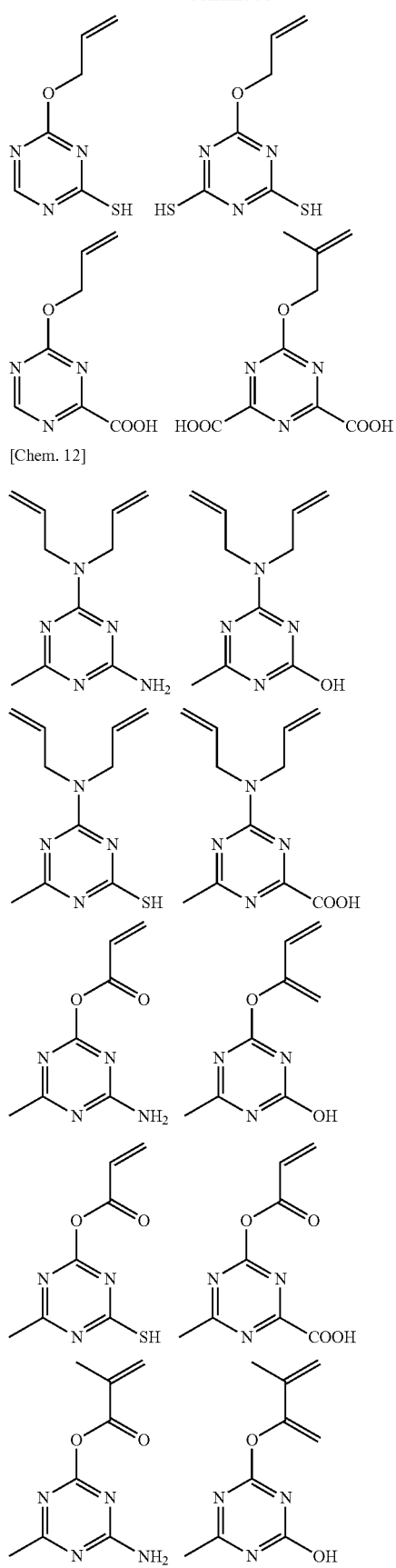
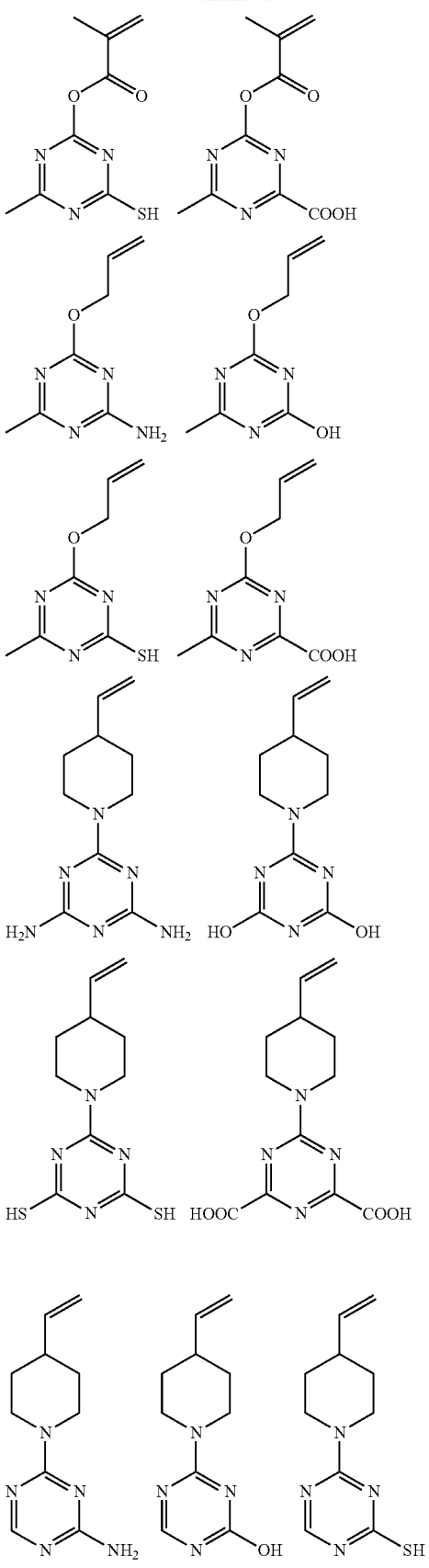

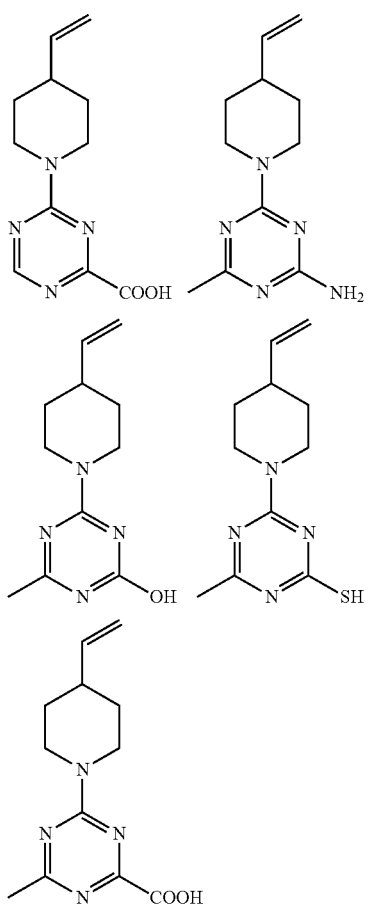

Among above compounds, the following compounds are preferable.

[Chem. 13]

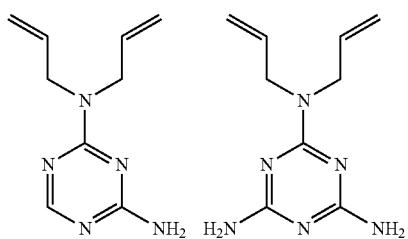

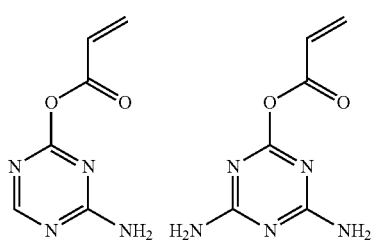

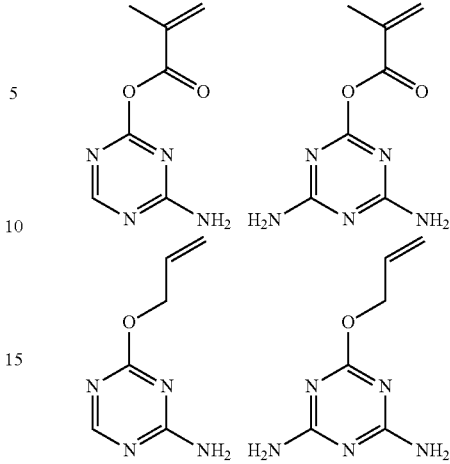

In addition, it is also preferable to use a polyfunctional compound having a hydroxyl group such as N,N'-di(meth)acryloyl-1,2-dihydroxyethylenediamine, glycerol di(meth)acrylate, pentaerythritol tri(meth)acrylate, pentaerythritol di(meth)acrylate, dipentaerythritol penta(meth)acrylate, 2-hydroxy-3-((meth)acryloyloxypropyl) (meth)acrylate, ethyleneglycol diglycidyl ether di(meth)acrylate, diethyleneglycol diglycidyl ether di(meth)acrylate, and diglycidyl phthalate di(meth)acrylate as the polar polymerizable compound (A2-2). Such a polyfunctional polar polymerizable compound (A2-2) is capable of improving the adhesion of the resin coating that is formed by the polymerization of the polymerizable compound (A) to the surface of the object to be treated not only by the action of the hydroxyl group but also by the crosslinking of molecular chains.

The ratio of the mass of the adhesive polymerizable compound (A2) with respect to the mass of the polymerizable compound (A) is not particularly limited as long as the objective of the present invention is not impaired. From the viewpoint of satisfying both a favorable hydrophilization effect and the favorable adhesion of the resin coating to be formed to the surface of the object to be treated, the ratio of the mass of the adhesive polymerizable compound (A2) with respect to the mass of the polymerizable compound (A) is preferably 0.1% by mass or more and 50% by mass or less, more preferably 0.1% by mass or more and 40% by mass or less, still more preferably 0.1% by mass or more and 30% by mass or less, far still more preferably 0.1% by mass or more and 10% by mass or less and particularly preferably 0.1% by mass or more and 5% by mass or less.

[Polyfunctional Monomer (A3)]

The polymerizable compound (A) may include a polyfunctional monomer (A3) other than the polymerizable betaine compound (A1) and the adhesive polymerizable compound (A2). The polyfunctional monomer (A3) is a compound that has two or more ethylenic unsaturated double bonds and does not correspond to the polymerizable betaine compound (A1) and the adhesive polymerizable compound (A2). The polyfunctional monomer (A3) crosslinks molecular chains in the resin coating that is formed by the polymerization of the polymerizable compound (A). The crosslinking improves toughness such as the hardness of the resin coating or the adhesion of the resin coating to the surface of the object to be treated.

Specific examples of the polyfunctional monomer (A3) include an ethyleneglycol di(meth)acrylate, a diethyleneglycol di (meth)acrylate, a triethyleneglycol di(meth)acrylate, a tetraethyleneglycol di(meth)acrylate, a pentaethyleneglycol di(meth)acrylate, a hexaethyleneglycol di (meth)acrylate, a heptaethyleneglycol di(meth)acrylate, an octaethyleneglycol di(meth)acrylate, a nonaethyleneglycol di(meth)acrylate, a decaethyleneglycol di(meth)acrylate, a propyleneglycol di(meth)acrylate, a dipropyleneglycol di(meth)acrylate, a tripropyleneglycol di (meth)acrylate, a tetrapropyleneglycol di(meth)acrylate, a pentapropyleneglycol di(meth)acrylate, a hexapropyleneglycol di(meth)acrylate, a heptapropyleneglycol di(meth)acrylate, an octapropyleneglycol di(meth)acrylate, a nonapropyleneglycol di(meth)acrylate, a decapropyleneglycol di(meth)acrylate, a butyleneglycol di(meth)acrylate, a neopentylglycol di(meth)acrylate, a 1,6-hexaneglycol di(meth)acrylate, a trimethylolpropane tri (meth)acrylate, a pentaerythritol tetra(meth)acrylate, dipentaerythritol hexa(meth)acrylate, a 2,2-bis(4-(meth)acryloxydiethoxyphenyl)propane, a 2,2-bis(4-(meth)acryloxypolyethoxyphenyl)propane, and the like.

The ratio of the mass of the polyfunctional monomer (A3) with respect to the mass of the polymerizable compound (A) is not particularly limited as long as the objective of the present invention is not impaired. From the viewpoint of appropriately crosslinking the polymer of the polymerizable compound (A), the ratio of the mass of the polyfunctional monomer (A3) with respect to the mass of the polymerizable compound (A) is preferably 0.5% by mass or more and 20% by mass or less, more preferably 1% by mass or more and 15% by mass or less and still more preferably 1% by mass or more and 10% by mass or less.

[Other Monomer (A4)]

The polymerizable compound (A) may include other monomer (A4) other than the polymerizable betaine compound (A1), the adhesive polymerizable compound (A2), and the polyfunctional monomer (A3) to an extent that the objective of the present invention is not impaired. Other monomer (A4) is a compound that has an ethylenic unsaturated double bond and does not correspond to the polymerizable betaine compound (A1), the adhesive polymerizable compound (A2), and the polyfunctional monomer (A3).

Examples of other monomer (A4) include a methyl (meth)acrylate, an ethyl (meth)acrylate, an isopropyl (meth)acrylate, an n-propyl (meth)acrylate, an n-butyl (meth)acrylate, an isobutyl (meth)acrylate, a tert-butyl (meth)acrylate, an n-pentyl (meth)acrylate, an isopentyl (meth)acrylate, a phenyl (meth)acrylate, an N-methyl (meth)acrylamide, an N-ethyl (meth)acrylamide, an N-n-propyl (meth)acrylamide, an N-isopropyl (meth)acrylamide, an N-n-butyl (meth)acrylamide, an N-n-pentyl (meth)acrylamide, an N-isopentyl (meth)acrylamide, an N-phenyl (meth)acrylamide, an N,N-dimethyl (meth)acrylamide, an N,N-diethyl (meth)acrylamide, an N,N-di-n-propyl (meth)acrylamide, an N,N-di-n-butyl (meth)acrylamide, an N,N-di-n-pentyl (meth)acrylamide, a styrene, an α-methylstyrene, a β-methylstyrene, an o-methylstyrene, a m-methylstyrene, a p-methylstyrene, a chlorostyrene, a methyldiallylamine, an ethyldiallyamine, a triallylamine, and the like.

The ratio of the mass of other monomer (A4) with respect to the polymerizable compound (A) is not particularly limited as long as the polymerizable compound (A) include desired amount of the polymerizable betaine compound (A1) and the adhesive polymerizable compound (A2)

The ratio of the mass of the polymerizable compound (A) with respect to the mass of the polymerizable composition is preferably 1% by mass or more and 40% by mass or less, more preferably 2% by mass or more and 20% by mass or less, and further preferably 2% by mass or more and 15% by mass or less.

<Polymerization Initiator (B)>

The polymerizable composition includes a polymerization initiator (B) as a component that polymerizes the polymerizable compound (A). The polymerization initiator (B) includes a water-soluble radical polymerization initiator (B1). The polymerization initiator (B) is not particularly limited as long as the polymerization initiator (B) is a compound capable of polymerizing the polymerizable compound (A) having an ethylenic unsaturated double bond. In addition, the water-soluble radical polymerization initiator (B1) is not particularly limited as long as the water-soluble radical polymerization initiator (B1) is a compound that progresses the polymerization of the polymerizable compound (A) in water systems by being partially or fully dissolved in water or a water-containing solvent.

Appropriate examples of the water-soluble radical polymerization initiator include a water-soluble azo polymerization initiator (B1-1) and a water-soluble peroxide (B1-2). Between these, the water-soluble azo polymerization initiator (B1-1) is preferable since, unlike the water-soluble peroxide (B1-2) that may cause self-induced decomposition in which a radical generated by the water-soluble peroxide (B1-2) promotes the decomposition of a peroxide, the water-soluble azo polymerization initiator (B1-1) is not self-induced decomposable so as not to cause the above-described self-induced decomposition and follows a primary reaction and a stable reaction rate can be obtained regardless of solvents.

Specific examples of the water-soluble azo polymerization initiator include 2,2'-azobis(2-methylpropionamidine) dihydrochloride, 2,2'-azobis[2-methyl-N-(2-hydroxyethyl) propionamide], 2,2'-azobis[2-(phenylamidino)propane] dihydrochloride, 2,2'-azobis{2-[N-(4-chlorophenyl)amidino]propane} dihydrochloride, 2,2'-azobis{2-[N-(4-hydroxyphenyl)amidino]propane} dihydrochloride, 2,2'-azobis[2-(N-benzylamidino)propane] dihydrochloride, 2,2'-azobis[2-(N-allylamidino)propane] dihydrochloride, 2,2'-azobis(2-amidinopropane) dihydrochloride, 2,2'-azobis{2-[N-(2-hydroxyethyl)amidino]propane} dihydrochloride, 2,2-azobix[2-(5-methyl-2-imidazolin-2-yl)propane] dihydrochloride, 2,2-azobis[2-(2-imidazolin-2-yl)propane] dihydrochloride, 2,2-azobis[2-(4,5,6,7-tetrahydro-1H-1,3-diazepine-2-yl)propane] dihydrochloride, 2,2-azobis[2-(3,4,5,6-tetrahydropyrimidine-2-yl)propane] dihydrochloride, 2,2-azobis[2-(5-hydroxy-3,4,5,6-tetrahydropyrimidine-2-yl)propane] dihydrochloride, 2,2-azobis{2-[1-(2-hydroxyethyl)-2-imidazolin-2-yl]propane} dihydrochloride, and 2,2-azobis[2-(2-imidazolin-2-yl)propane]. These water-soluble azo polymerization initiators (B1-1) may be used singly or two or more thereof may be used in combination.

Specific examples of the water-soluble peroxide (B1-2) include an alkyl peroxide such as isobutyl peroxide, and decanoyl peroxide; a carboxylic acid anhydride peroxide such as an acetyl peroxide; an aromatic carboxylic acid anhydride peroxide such as a benzoyl peroxide; a polycarboxylic acid peroxide such as succinic acid peroxide; a peroxy dicarbonate such as a diisopropyl peroxy dicarbonate, a di-2-ethylhexyl peroxy dicarbonate, and an diallyl peroxy dicarbonate; a peroxy ester such as tert-butyl peroxy isobutyrate, tert-butyl peroxy neodecanoate, and a cumene peroxy neodecanoate; a peroxy anhydride of a carboxy acid and a sulfonic acid such as acetyl cyclohexyl sulfonyl peroxide; an inorganic peroxide such as an ammonium persulphate, a potassium persulphate, a potassium chlorate, a potassium bromate, and a potassium superphosphate. These water-soluble peroxides (B1-1) may be used singly or two or more thereof may be used in combination.

The ratio of the mass of the water-soluble radical polymerization initiator (B1) with respect to the mass of the polymerization initiator (B) is not particularly limited as long as a coating having a desired film thickness can be formed using the polymerizable composition. The ratio of the mass of the water-soluble radical polymerization initiator (B1) with respect to the mass of the polymerization initiator (B) is preferably 50% by mass or more, more preferably 70% by mass or more, still more preferably 90% by mass or more and most preferably 100% by mass. In a case where a water-insoluble radical polymerization initiator (B2) is used together with the water-soluble radical polymerization initiator (B1), the type of the water-insoluble radical polymerization initiator (B2) is not particularly limited. The water-insoluble radical polymerization initiator (B2) is a radical polymerization initiator that does not correspond to the water-soluble radical polymerization initiator (B1). The amount of the polymerization initiator (B) used is not particularly limited as long as the polymerization initiator is capable of favorably initiating a polymerization reaction. The amount of the polymerization initiator (B) used is preferably 0.1% by mass or more and 20% by mass or less and more preferably 0.1% by mass or more and 15% by mass or less with respect to the mass of the polymerizable compound (A).

From the viewpoint of the stability over time of the polymerizable composition, the polymerizable composition may be a two-component composition including a first liquid including the polymerizable compound (A) and a solvent (S) and a second liquid including the polymerization initiator (B) and a solvent (S). Such a two-component composition is used after the two liquids are mixed together immediately before a surface treatment. In this case, the inorganic fine particles (C) may be included in any of the first liquid and the second liquid and may be included in both of the first liquid and the second liquid.

[Inorganic Fine Particles (C)]

The polymerizable composition includes inorganic fine particles (C). The inorganic fine particles (C) have a functional group capable of forming a covalent bond with the polymer of the polymerizable compound (A). Therefore, when a coating is formed by heating a coating film that is formed by applying the polymerizable composition, the inorganic fine particles (C) are incorporated into the polymer of the polymerizable compound (A) by covalent bonds. As a result, a coating having a thick film thickness, high hardness and excellent durability can be formed on the surface of the object to be treated.

The inorganic fine particles (C) have a functional group capable of forming a covalent bond with the polymer of the polymerizable compound (A). As the inorganic fine particles (C), inorganic fine particles composed of an inorganic material having the above-described functional group can be used, and inorganic fine particles surface-modified with an organic compound having the above-described functional group can be used.

In a case where the polymer of the polymerizable compound (A) and the inorganic fine particles (C) covalently bond to each other by a reaction between a functional group in the polymer of the polymerizable compound (A) and the functional group in the inorganic fine particles (C), the combination between the functional group in the polymer of the polymerizable compound (A) and the functional group in the inorganic fine particles (C) is not particularly limited. For example, in a case where the polymerizable compound (A) includes the unsaturated group-containing silicon compound (A2-1) as the adhesive polymerizable compound (A2), the polymer of the polymerizable compound (A) has a hydrolysable silyl group. In this case, preferable examples of the functional group in the inorganic fine particles (C) include a hydroxyl group, a carboxy group, an amino group and the like. These groups form a covalent bond by the hydrolytic condensation with the hydrolysable silyl group. In addition, in a case where the polymer of the polymerizable compound (A) has an amino group or a carboxy group, preferable examples of the functional group in the inorganic fine particles (C) include an epoxy group, a hydrolysable silyl group and the like. Furthermore, in a case where the inorganic fine particles (C) have an ethylenic unsaturated double bond, the inorganic fine particles are capable of covalently bonding to the polymerizable compound (A). The combination between the functional group in the polymer of the polymerizable compound (A) and the functional group in the inorganic fine particles (C) is not particularly limited.

As the inorganic fine particles (C), silica fine particles or metal oxide fine particles having a hydroxyl group such as a silanol group on the surface can be preferably used. In addition, silica fine particles or metal oxide fine particles surface-modified with an organic compound having a functional group capable of forming a covalent bond with the polymer of the polymerizable compound (A) are also preferable as the inorganic fine particles (C). Examples of the metal oxide fine particles include metal oxide fine particles composed of a metal oxide such as titanium oxide ($TiO_2$), zinc oxide (ZnO), yttrium oxide ($Y_2O_3$), hafnium oxide ($HfO_2$) or zirconium oxide ($ZrO_2$). As the inorganic fine particles (C), silica particles are preferable since it is easy to procure fine particles having a variety of particle diameters or to form a coating having high hardness using the polymerizable composition.

Examples of the organic compound that is used to introduce the functional group that reacts with the functional group in the polymer of the polymerizable compound (A) to form a covalent bond into the inorganic fine particles (C) by surface modification include amino silanes such as 2-aminoethyltrimethoxysilane, 3-aminopropyltrimethoxysilane, 4-aminobutyltrimethoxysilane, 2-aminoethyltriethoxysilane, 3-aminopropyltriethoxysilane and 4-aminobutyltriethoxysilane; epoxy silanes such as 2-glycidoxyethyl trimethoxysilane, 3-glycidoxypropyltrimethoxysilane, 4-glycidoxybutyltrimethoxysilane, 2-glycidoxyethyltrimethoxysilane, 3-glycidoxypropyltriethoxysilane and 4-glycidoxybutyltriethoxysilane; and unsaturated group-containing silanes such as 2-(meth)acryloyloxyethyl trimethoxysilane, 3-(meth)acryloyloxypropyltrimethoxysilane, 4-(meth)acryloyloxybutyltrimethoxysilane, 2-(meth) acryloyloxyethyltriethoxysilane, 3-(meth)acryloyloxypropyltriethoxysilane, 4-(meth) acryloyloxybutyltriethoxysilane, vinyltrimethoxysilane, vinyltriethoxysilane, allyltrimethoxysilane and allyltriethoxysilane.

A method for the surface modification of the inorganic fine particles (C) with the organic compound is not particularly limited. The surface modification can be carried out by a variety of well-known methods.

The particle diameters of the inorganic fine particles (C) are not particularly limited. The particle diameters of the inorganic fine particles (C) are appropriately determined in consideration of the film thickness of a coating that is formed using the polymerizable composition. The average particle diameter of the inorganic fine particles (C) is preferably 5 nm or more and 5000 nm or less and more preferably 10 nm or more and 400 nm or less. The average particle diameter (nm) of the inorganic fine particles (C) can be obtained based on the following expression from the specific surface area (m²/g) of the inorganic fine particles (C), which is obtained by the BET method, and the density (g/m³) of the inorganic fine particles.

Average particle diameter (nm)=6/(specific surface area (m²/g)×density (g/m³))×10⁻⁹

The content of the inorganic fine particles (C) in the polymerizable composition is not particularly limited as long as a desired effect is not impaired. Regarding the content of the inorganic fine particles (C), the ratio of the mass of the inorganic fine particles (C) with respect to the mass obtained by subtracting the mass of the solvent (S), which will be described below, from the mass of the polymerizable composition is preferably 20% by mass or more and 80% by mass or less and more preferably 30% by mass or more and 70% by mass or less since the formation of a thick coating having high hardness using the polymerizable composition is easy. In addition, the ratio of the mass of the inorganic fine particles (C) with respect to the mass of the polymerizable compound (A) is preferably 10% by mass or more and 200% by mass or less and more preferably 50% by mass or more and 150 by mass or less.

[Solvent (S)]

Polymerizable composition includes a solvent (S). The solvent (S) may be water, an organic solvent or an aqueous solution of an organic solvent. From the viewpoint of the solubility of the polymerizable compound (A), the safety of working for a hydrophilizing treatment, low costs and the like, the solvent (S) is preferably water. Preferable examples of the organic solvent that is used as the solvent (S) include alcohols. Examples of the alcohols include aliphatic alcohols, and alcohols having 1 or more and 3 or less carbon atoms are preferable. Specific examples thereof include methanol, ethanol, n-propyl alcohol and isopropyl alcohol (IPA), and methanol, ethanol and isopropyl alcohol are preferable. The alcohols may be used singly or two or more thereof may be used in combination.

A content of the water in the solvent (S) is preferably 50% by mass or more, more preferably 80% by mass or more, and particularly preferably 100% by mass.

The amount of the solvent (S) used is not particularly limited. The solvent (S) is preferably used in an amount in which the solid content concentration of the polymerizable composition is 0.1% by mass or more and 20% by mass or less from the viewpoint of the coatability of the polymerizable composition.

[Other Components]

The polymerizable composition may include a variety of additive to an extent that the objective of the present invention is not impaired. Examples of such additives include an antioxidant, an ultraviolet absorber, a colorant, a defoamer, a viscosity modifier and the like. The content of these additives is appropriately determined in consideration of an amount in which these additives are ordinarily used.

<<Hydrophilizing Treatment Method>>

The hydrophilizing treatment method includes: applying the polymerizable composition to form a coating film on the surface of an object to be treated, and heating the coating film to form a coating on the surface of the object to be treated. Here, there is no need to apply the polymerizable composition uniformly to the entire surface of the object to be treated, which is supposed to be hydrophilized, as long as the surface of the object to be treated is hydrophilized as much as desired. The hydrophilizing treatment method preferably further includes rinsing the surface of the object to be treated with a rinse liquid after the heating of the coating. Particularly, rinsing with water or an aqueous solution of an organic solvent makes it easy to remove a polymer having a low polymerization degree or crosslinking degree and having a low molecular weight from the coating.

Hereinafter, applying the polymerizable composition to form a coating film on the surface of the object to be treated will also be referred to as the "application step". Heating the coating film to form a coating on the surface of the object to be treated will also be referred to as the "heating step". Rinsing the surface of the object to be treated with a rinse liquid after the heating of the coating will also be referred to as the "rinsing step". Hereinafter, the application step, the heating step and the rinsing step will be described in detail.

<Application Step>

In the application step, the polymerizable composition is applied to the surface of an object to be treated to form a coating film. The application method is not particularly limited. Specific examples of the application method include a spin coating method, a spraying method, a roller coating method, an immersion method and the like. In a case where the object to be treated is a substrate, the spin coating method is preferable as the application method since it is easy to evenly form a coating film having a uniform film thickness on the surface of the substrate.

The material of the surface of the object to be treated to which the polymerizable composition is applied is not particularly limited and may be an organic material or an inorganic material. Examples of the organic material include a variety of resin materials such as a polyester resin such as a PET resin or a PBT resin, a variety of nylons, a polyimide resin, a polyamide-imide resin, a polyolefin such as polyethylene or polypropylene, polystyrene, a (meth)acrylic resin, a cycloolefin polymer (COP), a cycloolefin copolymer (COC) and a silicone resin (for example, polyorganosiloxane such as polydimethylsiloxane (PDMS)). In addition, a photosensitive resin component that is included in a variety of resist materials as well as an alkali-soluble resin component are also preferable as the organic material. Examples of the inorganic material include glass, silicon and a variety of metals such as copper, aluminum, iron and tungsten. The metals may be alloys.

The shape of the object to be treated is not particularly limited. The object to be treated may be flat or a three-dimensional shape, for example, a spherical shape or a columnar shape.

The object to be treated may be exposed to a chemical such as a washing agent, and there is a concern that the exposure to the chemical may degrade the hydrophilicity of the coating formed on the object to be treated. However, the use of the above-described polymerizable composition makes it possible to suppress the deterioration of the hydrophilicity in a case where the surface-treated surface has come into contact with a variety of chemicals. Therefore, when an object to be treated that is often exposed to a chemical such as a washing agent, for example, a window, a mirror, furniture, a glass member provided in an optical device (for example, a device having a lens) or a translucent resin member is employed as an object to be treated, it is possible to exhibit an effect on, particularly, the chemical resistance of the hydrophilicity.

After the polymerizable composition is applied to the surface of the object to be treated, at least part of the solvent (S) may be removed from the coating formed of the surface treatment liquid as necessary by a well-known drying method.

The film thickness of the coating film that is formed in the application step is not particularly limited as long as a coating having a desired film thickness is formed in the end.

The thickness of the coating film that is formed by the application step can be adjusted by adjusting the solid content concentration of the polymerizable composition, an application condition and the like.

<Heating Step>

In the heating step, the coating film formed in the application step is heated. The heating makes the polymerizable compound (A) that is included in the coating film polymerize by an action of the thermal polymerization initiator (B) and makes the formation of a covalent bond between the polymer of the polymerizable compound (A) and the inorganic fine particles (C) proceed. As a result, a resin coating having high hardness that strongly bonds to the surface of the object to be treated is formed.

The heating conditions are not particularly limited as long as the polymerizable compound (A) polymerizes as much as desired and the object to be treated does not deteriorate or deform. The heating temperature is, for example, preferably 30° C. or more and 300° C. or less and more preferably 40° C. or more and 250° C. or less. The heating time is, for example, preferably one minute or more and six hours or less, more preferably three minutes or more and 60 minutes or less and still more preferably five minutes or more and 30 minutes or less. In addition, the heating is preferably carried out in a low-oxygen atmosphere for the purpose of favorably progressing radical polymerization. Examples of the low-oxygen atmosphere include atmospheres filled with an inert gas such as nitrogen, helium or argon, a vacuum condition and the like.

<Rinsing Step>

In the rinsing step, after the heating of the coating, the surface of the object to be treated is rinsed with a rinse agent. The rinsing makes it possible to remove a low-molecular-weight polymer having a low polymerization degree or crosslinking degree from the coating that is formed on the surface of the object to be treated. The rinse agent is not particularly limited as long as a coating having a desired film thickness can be formed. As the rinse agent, water, an organic solvent and an aqueous solution of an organic solvent can be used. As the rinse agent, water is preferable. A method for rinsing the coating is not particularly limited. Typically, the surface of the object to be treated is rinsed by bringing the rinse agent into contact with the coating by the same method as the above-described application method.

The film thickness of a coating that is obtained after the rinsing is, for example, preferably 10 nm or more and 2000 nm or less and more preferably 10 nm or more and 400 nm or less.

The thickness of the coating can be adjusted by adjusting the solid content concentration of the polymerizable composition, an application condition, the amount of the rinse agent used, the type of the rinse agent, the temperature of the rinse agent and the like.

After the rinsing, the object to be treated is dried as necessary and then preferably used in a variety of uses.

EXAMPLES

Hereinafter, the present invention will be more specifically described by showing examples, but the scope of the present invention is not limited to these examples.

Example 1, Example 2 and Comparative Example 1

In the examples and the comparative example, the following A1-1 and the following A1-2 were used in amounts shown in Table 1 as the polymerizable betaine compound (A1). In the examples and the comparative example, the following A2-1 was used in an amount shown in Table 1 as an adhesive polymerizable compound (A2). In the examples and the comparative example, 2,2'-azobis(2-methylpropionamidine) dihydrochloride (dihydrochloride) was used in an amount shown in Table 1 as a water-soluble radical polymerization initiator (B1). In the examples, the following C1 and C2 were used in amounts shown in Table 1 as inorganic fine particles. In the examples and the comparative example, water and propylene glycol monomethyl ether (PGME) were used in amounts shown in Table 1 as a solvent (S).

[Chem. 14]

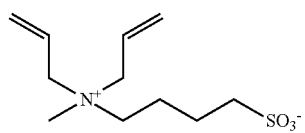

A1-1

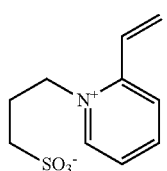

A1-2

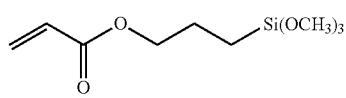

A2-1

C1: Silica fine particles (containing a Si—OH group)
C2: Silica fine particles surface-modified with a methacryloyl group-containing compound The polymerizable compound (A), the water-soluble radical polymerization initiator (B1), the inorganic fine particles (C) and the solvent (S) were each mixed according to the types and amounts shown in Table 1, thereby obtaining polymerizable compositions of Example 1, Example 2 and Comparative Example 1. In Comparative Example 1, the inorganic fine particles (C) were not used.

The following evaluation was carried out using the obtained polymerizable compositions.

<Water Contact Angle>

The polymerizable composition of each of Example 1 and Example 2 was applied onto a silicon wafer by spin coating under conditions of 1000 rpm and 60 seconds, and the wafer was heated at 100° C. for 10 minutes. Next, the surface of the wafer was washed with water to form a coating composed of a copolymer of the polymerizable compound (A) and the inorganic fine particles (C) on the wafer. Pure water drops (2.0 µL) were added dropwise to the surface-treated surface of the silicon wafer using DropMaster 700 (manufactured by Kyowa Interface Science Co., Ltd.), and the contact angles of the water were measured as contact angles after 10 seconds from the dropwise addition. The average value of the contact angles of the water at three points on the silicon wafer is shown in Table 1. The contact angle of water on the untreated silicon wafer is 13.8°.

<Measurement of Film Thickness>

The film thicknesses of coatings formed by the same method as for the measurement of the water contact angle using the polymerizable compositions of Example 1, Example 2 and Comparative Example 1 were measured by spectroscopic ellipsometry.

<Pencil Hardness>

The pencil hardness of the coatings formed by the same method as for the measurement of the water contact angle using the polymerizable compositions of Example 1, Example 2 and Comparative Example 1 were measured according to JIS K 5600.

TABLE 1

|  |  | Example 1 | Example 2 | Comparative examples 1 |
|---|---|---|---|---|
| Polymerizable betaine compound (A1) (Parts by mass) | A1-1 | 8 | — | — |
|  | A1-2 | — | 8 | 8 |
| Adhesive polymerizable compound (A2) (Parts by mass) | A2-1 | 0.1 | 0.1 | 0.1 |
| Water-soluble radical polymerization initiator (B1) (Parts by mass) |  | 1 | 1 | 1 |
| Inorganic fine particles (C) (Parts by mass) | C1 | 8 | — | — |
|  | C2 | — | 8 | — |
| Solvent (S) (Parts by mass) | Water | 80 | 50 | 80 |
|  | PGME | 20 | 50 | 20 |
| Contact angle of water (°) |  | 5.2 | 4.5 | — |
| Film thickness of coating (nm) |  | 113 | 125 | 3.8 |
| Pencil hardness |  | 3 H | 3 H | 3 B |

According to Example 1 and Example 2, it is found that, when a surface treatment is carried out using a polymerizable composition including the polymerizable betaine compound (A1), the adhesive polymerizable compound (A2), the water-soluble radical polymerization initiator (B1) and the inorganic fine particles (C), which each satisfy predetermined requirements, it is possible to favorably hydrophilize the surface of an object to be treated and to form a thick and hard coating having excellent durability on the surface of the object to be treated. In contrast, in the case of using the polymerizable composition not including the inorganic fine particles (C), films that could be formed were extremely thin and had low hardness and poor durability.

What is claimed is:

1. A polymerizable composition comprising:
a polymerizable compound (A);
a polymerization initiator (B);
inorganic fine particles (C); and
a solvent(S),
wherein the polymerizable compound (A) comprises a polymerizable betaine compound (A1) and an adhesive polymerizable compound (A2),
the polymerizable betaine compound (A1) has an ethylenic unsaturated double bond and a betaine structure,
the adhesive polymerizable compound (A2) has an ethylenic unsaturated double bond and at least one adhesive group selected from the group consisting of a hydrolysable silyl group, $-NH_2$, a carboxy group, a cyano group and a hydroxyl group,
a ratio of a mass of the adhesive polymerizable compound (A2) with respect to a mass of the polymerizable compound (A) is 0.1% by mass or more and 5% by mass or less,
the polymerization initiator (B) comprises a water-soluble radical polymerization initiator (B1),
the inorganic fine particles (C) have an average particle diameter of 5 nm or more and 5000 nm or less based on a specific surface area of the inorganic fine particles (C) obtained by BET method,
the inorganic fine particles (C) have a functional group capable of forming a covalent bond with a polymer of the polymerizable compound (A), and
the solvent(S) is an aqueous solution of alcohol.

2. The polymerizable composition according to claim 1, wherein the inorganic fine particles (C) are silica particles.

3. The polymerizable composition according to claim 1, wherein a ratio of a mass of the inorganic fine particles (C) with respect to a mass obtained by subtracting a mass of the solvent(S) from a mass of the polymerizable composition is 20% by mass or more and 80% by mass or less.

4. The polymerizable composition according to claim 1, wherein a ratio of a mass of the inorganic fine particles (C) with respect to a mass of the polymerizable compound (A) is 10% by mass or more and 200% by mass or less.

5. The polymerizable composition according to claim 4, wherein the ratio of the mass of the inorganic fine particles (C) with respect to the mass of the polymerizable compound (A) is 50% by mass or more and 150% by mass or less.

6. The polymerizable composition according to claim 1, wherein a solid content concentration of the polymerizable composition is 0.1% by mass or more and 20% by mass or less.

7. The polymerizable composition according to claim 1, wherein the water-soluble radical polymerization initiator (B1) is a water-soluble azo polymerization initiator.

8. The polymerizable composition according to claim 1, wherein the polymerizable betaine compound (A1) is a compound represented by the following formula (a1-ii),

(a1-ii)

wherein $R^3$, $R^4$, and $R^5$ are each independently a hydrocarbon group having an ethylenic unsaturated double bond, or a hydrocarbon group having 1 or more and 10 or less carbon atoms,
at least one of $R^3$, $R^4$, or $R^5$ is the hydrocarbon group having the ethylenic unsaturated double bond, $R^6$ is a divalent hydrocarbon group having 1 or more and 10 or less carbon atoms, and R is an anionic group.

9. The polymerizable composition according to claim 1, wherein the inorganic fine particles (C) are silica particles having a silanol group on surfaces thereof.

10. A hydrophilizing treatment method for hydrophilizing a surface of an object to be treated, the method comprising:
applying the polymerizable composition according to claim 1 to form a coating film on the surface of the object to be treated; and
heating the coating film to form a coating on the surface of the object to be treated.

11. The hydrophilizing treatment method according to claim 10, wherein the coating has a film thickness of 10 nm or more and 2000 nm or less.

12. A polymerizable composition comprising:
a polymerizable compound (A);
a polymerization initiator (B);
inorganic fine particles (C); and
a solvent(S),
wherein the polymerizable compound (A) comprises a polymerizable betaine compound (A1) and an adhesive polymerizable compound (A2), the polymerizable betaine compound (A1) has an ethylenic unsaturated double bond and a betaine structure, the adhesive polymerizable compound (A2) is an unsaturated group-containing silicon compound (A2-1) having an ethylenic unsaturated double bond and a hydrolysable silyl group, a ratio of a mass of the adhesive polymerizable compound (A2) with respect to a mass of the polymerizable compound (A) is 0.1% by mass or more and 5% by mass or less, the polymerization initiator (B) comprises a water-soluble radical polymerization initiator (B1), the inorganic fine particles (C) have an average particle diameter of 5 nm or more and 5000 nm or less based on a specific surface area of the inorganic fine particles (C) obtained by BET method, and the inorganic fine particles (C) have a functional group capable of forming a covalent bond with a polymer of the polymerizable compound (A).

13. The polymerizable composition according to claim 12, wherein the inorganic fine particles (C) are silica particles.

14. The polymerizable composition according to claim 12, wherein the polymerizable betaine compound (A1) is a compound represented by the following formula (a1-ii),

(a1-ii)

wherein $R^3$, $R^4$, and $R^5$ are each independently a hydrocarbon group having an ethylenic unsaturated double bond, or a hydrocarbon group having 1 or more and 10 or less carbon atoms, at least one of $R^3$, $R^4$, or $R^5$ is the hydrocarbon group having the ethylenic unsaturated double bond, $R^6$ is a divalent hydrocarbon group having 1 or more and 10 or less carbon atoms, and R is an anionic group.

* * * * *